United States Patent
Narasimhan et al.

(10) Patent No.: US 10,482,068 B2
(45) Date of Patent: Nov. 19, 2019

(54) AUTOMATED SYSTEMS AND TECHNIQUES TO MANAGE CLOUD-BASED METADATA CONFIGURATIONS

(71) Applicant: salesforce.com, inc., San Francisco, CA (US)

(72) Inventors: Anand Bashyam Narasimhan, Voorhees, NJ (US); Aleksandr Yefremovich Shekhter, Middletown, NJ (US); Rajan Chowhan, Mountain View, CA (US); Ganesh Mathrubootham, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 20 days.

(21) Appl. No.: 15/197,605

(22) Filed: Jun. 29, 2016

(65) Prior Publication Data

US 2018/0004509 A1 Jan. 4, 2018

(51) Int. Cl.
| | |
|---|---|
| *G06F 9/44* | (2018.01) |
| *G06F 16/178* | (2019.01) |
| *G06F 8/71* | (2018.01) |
| *G06F 16/18* | (2019.01) |
| *H04L 29/08* | (2006.01) |
| *G06F 16/11* | (2019.01) |
| *H04L 29/06* | (2006.01) |

(52) U.S. Cl.
CPC ........... *G06F 16/1787* (2019.01); *G06F 8/71* (2013.01); *G06F 16/11* (2019.01); *G06F 16/178* (2019.01); *G06F 16/1873* (2019.01); *H04L 67/1095* (2013.01); *H04L 63/0227* (2013.01)

(58) Field of Classification Search
CPC ......... G06F 17/30306; G06F 17/30215; G06F 17/30067; G06F 11/1402; G06F 3/0605; G06F 3/0686; G06F 9/5011; G06F 16/213; G06F 16/178; G06F 16/1787; H04L 67/1095; H04L 63/0227; G06Q 30/02
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,706,510 A * | 1/1998 | Burgoon ........... G06F 17/30067 |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

*Primary Examiner* — Tuan A Vu
(74) *Attorney, Agent, or Firm* — Jaffery, Watson, Mendonsa & Hamilton, LLP

(57) ABSTRACT

Metadata files are acquired from one or more storage devices corresponding to multiple different environments. The metadata files are compared to determine differences between the metadata files. A report is generated indicating actions to be taken to cause at least one of the metadata files to be modified to result in a most recent version. At least a portion of the actions in the report are performed automatically.

18 Claims, 8 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,065,347 B1 * | 11/2011 | DeMeyer .......... G06F 17/30306 707/806 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2002/0170045 A1 * | 11/2002 | Hahn .................... G06F 9/5011 717/162 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0185921 A1 * | 8/2007 | Prahlad ................ G06F 3/0605 |
| 2008/0134048 A1 * | 6/2008 | Leibow ................ G06Q 30/02 715/738 |
| 2009/0177744 A1 | 7/2009 | Marlow et al. |
| 2009/0234850 A1 * | 9/2009 | Kocsis ................ G06F 16/213 |
| 2013/0110778 A1 * | 5/2013 | Taylor .............. G06F 17/30215 707/624 |
| 2014/0146055 A1 * | 5/2014 | Bala .................... G06F 11/1402 345/501 |
| 2014/0337571 A1 * | 11/2014 | Sims .................... G06F 3/0686 711/111 |
| 2017/0264684 A1 * | 9/2017 | Spillane .............. H04L 67/1095 |

* cited by examiner

AUTOMATED SYSTEMS AND TECHNIQUES TO MANAGE CLOUD-BASED METADATA CONFIGURATIONS

TECHNICAL FIELD

Embodiments relate to techniques for correcting discrepancies in metadata. More particularly, embodiments relate to techniques for providing automated metadata analysis to find and/or correct discrepancies.

BACKGROUND

It is increasingly common for organizations with large and/or growing collections of data to utilize cloud-based data management architectures. As these architectures evolve and change, not only do the interfaces and features change but also the metadata that supports the functionality can change. These changes can be complex and difficult to track, which can increase the time and resources required to provide desired functionality. In addition, because metadata can be changed regularly by multiple users (also referred to as administrators), there is a need to provide an audit report of all changes that have occurred to an environment over time. Customers in certain industries e.g. financial services require by regulation to have proper audit controls and reporting mechanisms in place.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Described herein are mechanisms and architectures that can be utilized to find discrepancies between files, code and/or metadata between organizations within a multitenant environment. This can dramatically reduce the level of manual operations that are currently performed during the process of tracking changes and generating deployment packages for synchronization, code merges, etc. In one embodiment, the techniques described herein can be applied to metadata and/or custom metadata to automate and/or streamline metadata operations. Techniques described herein may be useful, for example, in the situation of a corporate merger or a corporate split.

In one embodiment, the mechanisms and architectures described herein can utilize one or more version management utilities to track and/or manage metadata and/or custom metadata types. These features and functions can result in a more efficient and less expensive development process, which can improve efficiency and profitability.

In one example embodiment, the mechanisms described herein are provided in an on-demand services environment, for example, one provided by salesforce.com. In one embodiment, the Metadata application program interface (API) of the salesforce.com platform can be used to deploy the metadata. Other platforms and environments can have similar APIs.

Currently some discrepancies between sets of metadata (e.g., between two organizations within a multitenant environment) may require manual evaluation and modification of metadata files. These discrepancies can be, for example, non-API supported metadata (e.g., changes in objects, assignment rules, sharing rules, permission sets, account teams, territory assignment rules, product schedule setup). The techniques described herein can also be used to support merging of metadata between multiple organizations.

Figure 1:
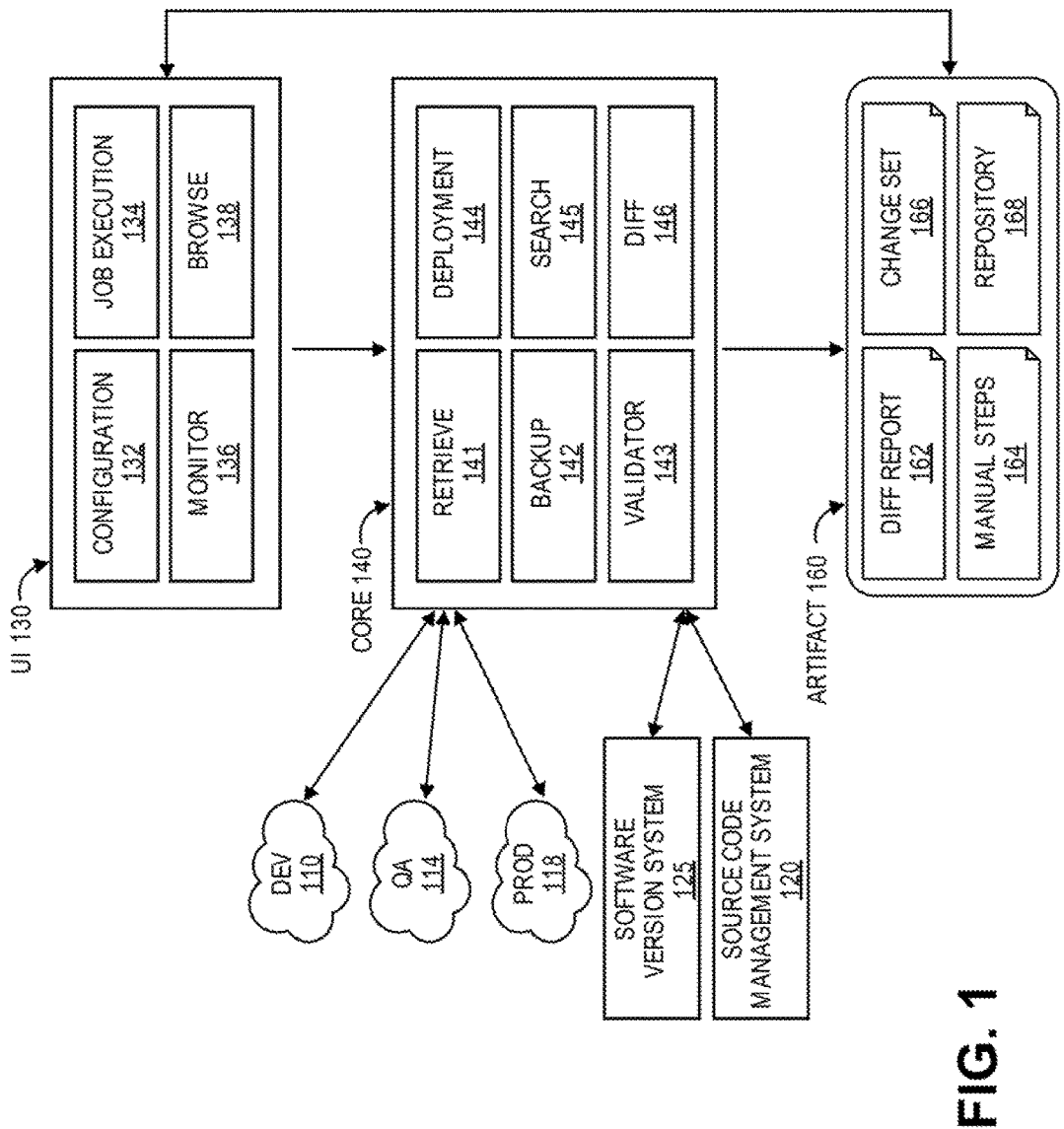
FIG. 1 is an architectural diagram of one embodiment of an environment for managing metadata discrepancies.

FIG. 1 is an architectural diagram of one embodiment of an environment for managing metadata discrepancies. The example of FIG. 1 several source environments that can provide content to core 140. In one embodiment, a user can utilize user interface (UI) 130 to interact with core 140.

In one embodiment, UI 130 can function to provide access to various types of metadata management tools that can be utilized. This can include, for example, configuration agent 132, job execution agent 134, monitor agent 136 and/or browsing agent 138. In one embodiment, core 140 provides functionality and tools to manage metadata to at least identify metadata discrepancies. In one embodiment, core 140 can receive metadata and/or other relevant data from one or more environments including development environment 110, quality assurance (QA) environment 114 and/or production environment 118.

The example of FIG. 1 includes three types of environments; however, in alternate embodiments, a different number of environments can be supported. In one embodiment, production environment 118 is the environment in which a users access resources provided by the underlying architecture, for example, an on-demand services environment such as a multitenant database environment, a social media platform, collaborative architecture.

In one embodiment, QA environment 114 provides a test environment in which application functionality can be tested prior to deployment and/or release. In one embodiment, development environment 110 is an environment in which applications and/or other functionality can be developed without affecting production environment 118 or QA environment 114. A tenant (or organization) within a multitenant environment can have one or more of these environments. For example, an organization can have a production environment in which the main functions of the organization are supported (tenant can have more then one production environment), a QA environment for each app/functional component to be released or tested, and a development environment for each app/functional component being developed.

In one embodiment, configuration agent 132 can operate to allow a user to configure elements of an application, data management and other configuration functions. For example, configuration agent 132 can allow a user (e.g., through a graphical user interface or through command line parameters) to change, modify or otherwise configure objects, assignment rules, sharing rules, permission sets, etc. Configuration agent 132 can operate to allow a user to perform metadata analysis as described herein. In one embodiment, job execution agent 134 allows a user to configure and/or initiate jobs for execution. These jobs can include, for example, metadata modification and/or analysis as described herein.

In one embodiment, monitor agent 138 allows a user to monitor metadata modification and/or analysis via, for example, graphical elements of UI 130. In one embodiment, browsing agent 136 allows a user to browse metadata and/or analysis results via, for example, graphical elements of UI 130.

In one embodiment, core 140 can retrieve source code from source code management system 120 that can operate as a distributed revision control system. In one embodiment, source code management system 120 provides a repository with complete history and version-tracking functionality. Source code management system 120 can be provided by, for example, git, which is free software distributed under the terms of the GNU General Public License version 2. Other source code management systems can also be supported.

In one embodiment, core 140 can retrieve source code from software versioning system 125 that can operate as a software versioning and revision control system. In one embodiment, software versioning system 125 functions to maintain current and historical versions of files such as source code, web pages and/or documents. Software versioning system 125 can be provided by, for example, Apache Subversion (SVN), which is free software distributed under the terms of the Apache License. Other software versioning systems can also be supported.

In one embodiment, core 140 retrieves metadata (e.g., with retrieval agent 141) from one or more of development environment 110, QA environment 114, production environment 118, source code management system 120 and/or software versioning system 125. In one embodiment, core 140 includes retrieval agent 141, backup agent 142, validator 143, deployment agent 144, search agent 145 and diff agent 146 to provide the metadata management functionality described herein.

In one embodiment, retrieval agent 141 operates to retrieve files from one or more of development environment 110, quality assurance (QA) environment 114, production environment 118, source code management system 120 and/or software versioning system 125. In one embodiment, backup agent 142 operates to create, manage and/or retrieve backup information (e.g., backup metadata files, backup index files). In one embodiment, validator agent 143 operates to validate software managed by core 140.

In one embodiment, deployment agent 144 operates to manage deployment of one or more software packages managed by core 140. In one embodiment, search agent 145 operates to provide search functionality for files, metadata and/or other data managed by core 140. In one embodiment, diff agent 146 operates to compare files (e.g., metadata) and determine a difference between the files. In one embodiment, diff agent 146 can further operate to generate and/or manage diff reports.

In one embodiment, core 140 operates to provide artifact module 160 with metadata management information. In one embodiment, artifact module 160 includes diff report agent 162, manual steps agent 164, change set agent 166 and repository 168.

In one embodiment, diff report agent 162 provides the results of an analysis of various metadata and provides a compilation of differences between the various metadata. In one embodiment, manual steps 164 corresponds to metadata that is to be migrated manually, for example, not migrated via a metadata API. In one embodiment, change set 166 corresponds to one or more sets of changes that should be treated as indivisible groups corresponding to changes between successive versions of metadata. Repository 168 is utilized to store metadata and/or other information.

Figure 2:
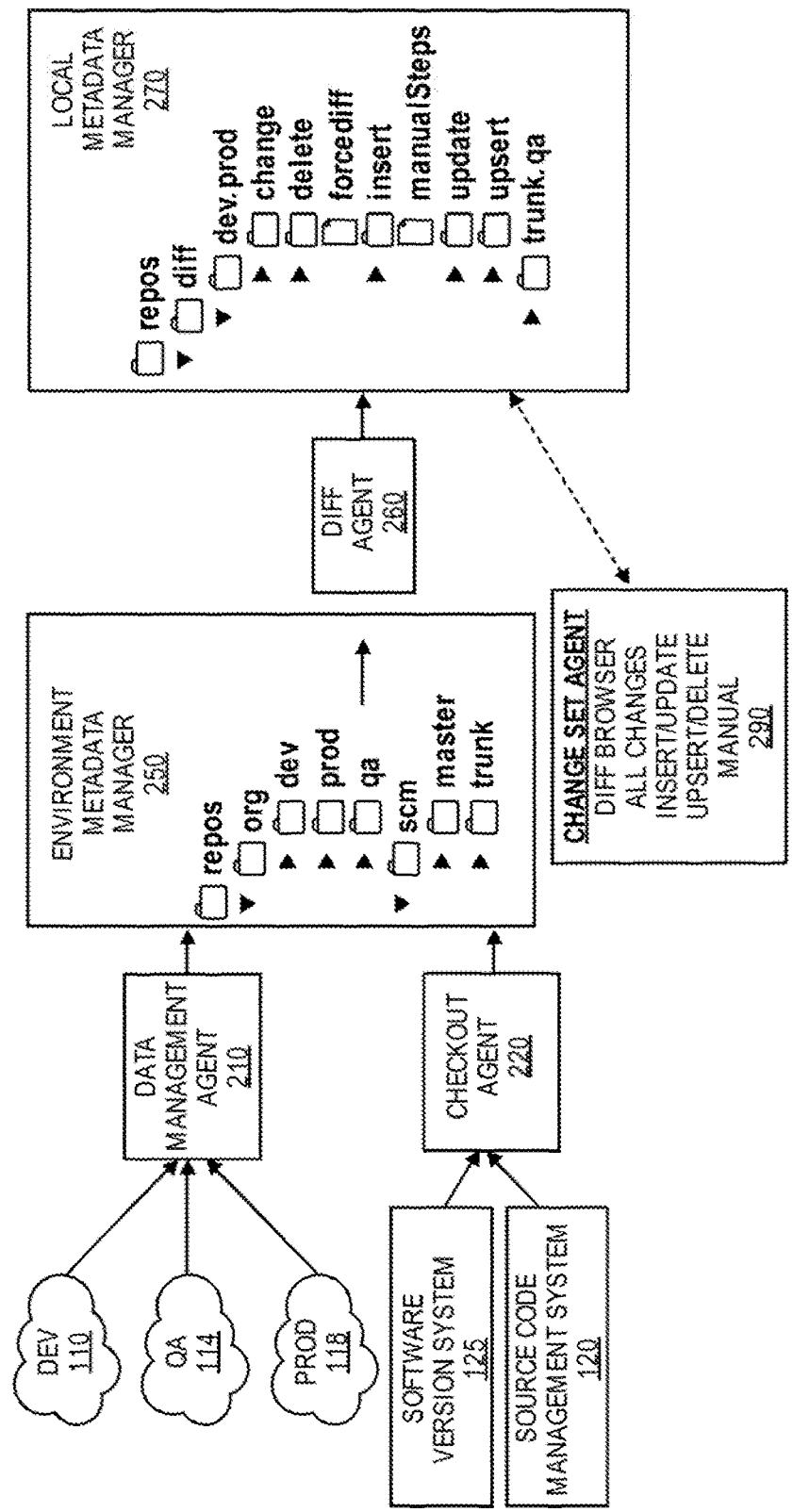
FIG. 2 is a conceptual diagram of one embodiment corresponding to some of the functionality of the core of FIG. 1.

FIG. 2 is a conceptual diagram of one embodiment corresponding to some of the functionality of core 140 of FIG. 1. In on embodiment, data management agent 210 collects metadata from one or more environments including development environment 110, quality assurance (QA) environment 114 and/or production environment 118. Data management agent 210 can include one or more of the agents within core 140 discussed above (e.g., retrieval agent 141). Similarly checkout agent 220 collects code from source code management system 120 and/or software versioning system 125. Checkout agent 220 can include one or more of the agents from within core 140 discussed above (e.g., validator 143).

In one embodiment, environment metadata manager 250 receives metadata to be analyzed from data management agent 210 and/or checkout agent 220. Environment metadata manager 250 operates to gather and manage metadata from multiple sources via one or more channels (e.g., data management agent 210 and/or checkout agent 220). In one embodiment, environment metadata manager operates to consolidate and manage metadata from various sources. As illustrated in FIG. 2, environment metadata manager 250 provides a file system to manage metadata.

Diff agent 260 operates to analyze metadata (an optionally other data) managed by environment metadata manager 250 to determine differences between various configurations and/or files. For example, differences between metadata for different versions of software within development environment 110 can be determined. As another example, differences between a software version from development environment 110 and production environment 118 can be determined.

In one embodiment, diff agent 260 provides results to local metadata manager 270. Local metadata manager 270 can operate to collect and/or analyze results provided by diff agent 260. In one embodiment, local metadata manager 270 can maintain a file structure for storing metadata difference information. In one embodiment, local metadata manager 270 can determine and/or implement updates between metadata versions that can be made current as the result of changes, deletions, inserts, updates, upserts and/or manual steps. In one embodiment, local metadata manager 270 operates to automatically implement the metadata changes that would otherwise be made via manual steps.

In one embodiment, local metadata manager 270 interacts with change set agent 290 to provide change set information corresponding to various metadata versions and configurations. In one embodiment, change set agent 290 provides a browser functionality (e.g., diff browser) to allow a user to review and/or evaluate change set information. In one embodiment, change set agent 290 allows a user to view all changes, to view changes that would require insert and/or update operations, to view changes that would require upsert and/or delete changes, and/or to view changes that would require deletions (changes can be reviewed manually or even scripted through command line interfaces provided in 140 also).

In one embodiment, change set agent 290 allows the user to control and/or configure metadata changes to be made as a result of the difference processing described herein. In one embodiment, change set agent 290 operates in conjunction with a graphical user interface that allows the user to interact with the metadata change/difference information described herein (changes can be reviewed manually or even scripted through command line interfaces provided in 140 also).

Figure 3:
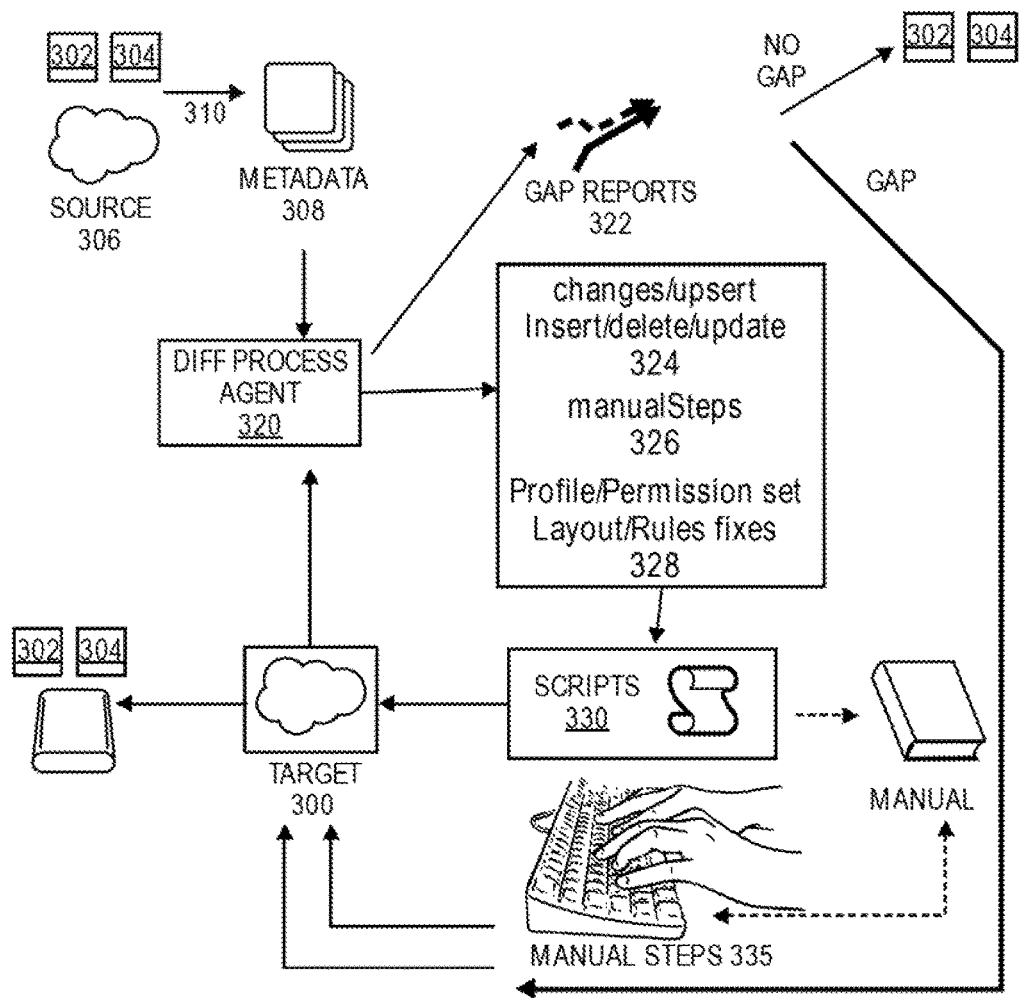
FIG. 3 is a conceptual diagram of one embodiment of a metadata migration process.

FIG. 3 is a conceptual diagram of one embodiment of a metadata migration process. In one embodiment the metadata migration process is managed by core 140 in FIG. 1. In one embodiment, a backup is made of the target metadata, 300. This can be an optional process.

In one embodiment, metadata is checked out (310) from source code management system 302, software version system 304 and/or source environments 306 (e.g., development environment(s), quality assurance environment(s), production environment(s)). Gathered metadata 308 is provided to diff process agent 320.

In one embodiment, diff process agent 320 is a utility tool that can operate to validate code and generate one or more metadata packages/reports. Diff process agent 320 can be, for example, Apache Ant, which is available from Apache Software Foundation under Apache License 2.0. Apache Ant is a software tool for automating software build processes similar to the unix make build tool. Other agents/components can be utilized to provide the functionality of diff process agent 320.

In one embodiment, diff process agent 320 generates one or more of: gap report 322 indicating differences between one or more metadata file, change, upsert, insert, delete, update package(s) 324 indicating changes to be made to one or more metadata files, manual steps package 326 indicating manual changes to be made to one or more metadata files, and/or profile, permission set, layout, rule fix package(s) 328 indicating changes to be made in response to metadata changes.

In one embodiment, diff process agent 320 can run one more scripts 330 to deploy and/or update/change metadata files in target environment 300 in response to one or more of the reports or packages discussed above. In one embodiment, after script(s) 330 are run, manual steps can be presented to be performed by one or more users 335.

In one embodiment, after script(s) 330 are run and manual steps 335 are performed, the previously described operations are performed again to verify migration of the metadata. After the subsequent running of these operations, gap reports 322 and/or other reports can be reviewed to determine whether any metadata gaps exist. If no metadata gaps exist, updated files can be sent to the source code management system and/or the software version system. If metadata gaps exist, corresponding updates can be performed (e.g., via manual steps) and the process can be repeated until no metadata gaps exist.

Figure 4:
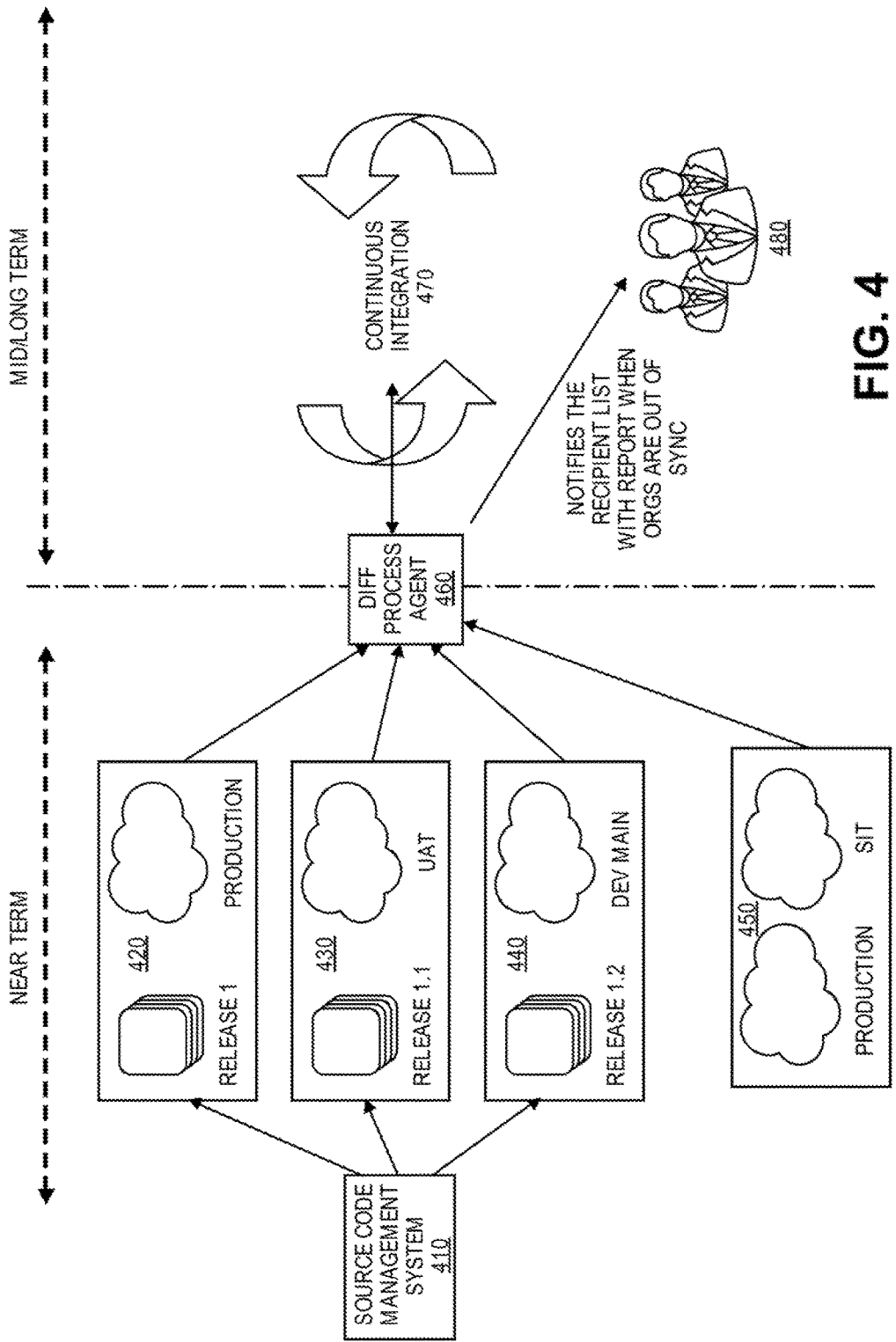
FIG. 4 is a block diagram of an architecture in which metadata can be managed utilizing the techniques described herein.

FIG. 4 is a block diagram of an architecture in which metadata can be managed utilizing the techniques described herein. The example of FIG. 4 provides mechanisms for near term metadata management as well as mid/long term metadata management.

In one embodiment, source code management system 410 functions to provide various versions of source code production environment 420, user-acceptance testing (UAT) environment 430 and development environment 440. In one embodiment production environment 420 receives release version 1.0, which represents a stable version of the code being used, UAT environment 430 receives release 1.1 of the code and development environment 440 receives release version 1.2 of the code. In one embodiment, environment 450 can also have a version of the code.

Diff process agent 460 analyzes metadata and/or other information from each of the environments discussed above. In one embodiment, diff process agent 460 operates on the metadata received from each of the environments to determine differences between the various metadata sets. In one embodiment, diff process agent 460 can provide the difference information to continuous integration agent 470. Continuous integration agent 470 can be, for example, Jenkins, which is an open source tool. In one embodiment, diff process agent 460 can maintain a list of entities (e.g., developers, environment administrators) to notify when one or more organizations are out of sync 480 as determined by analysis of the metadata. It is possible to use diff process agent 460 with Continuous integration agent 470 in the automated mode to deploy change sets to the target environment(s), run appropriate test suite thus significantly reduce development time (continuous integration and deployment). This can happen if user uses only well supported metadata (e.g. Apex code, triggers, VF pages and components), so manual steps are not necessary.

Figure 5:
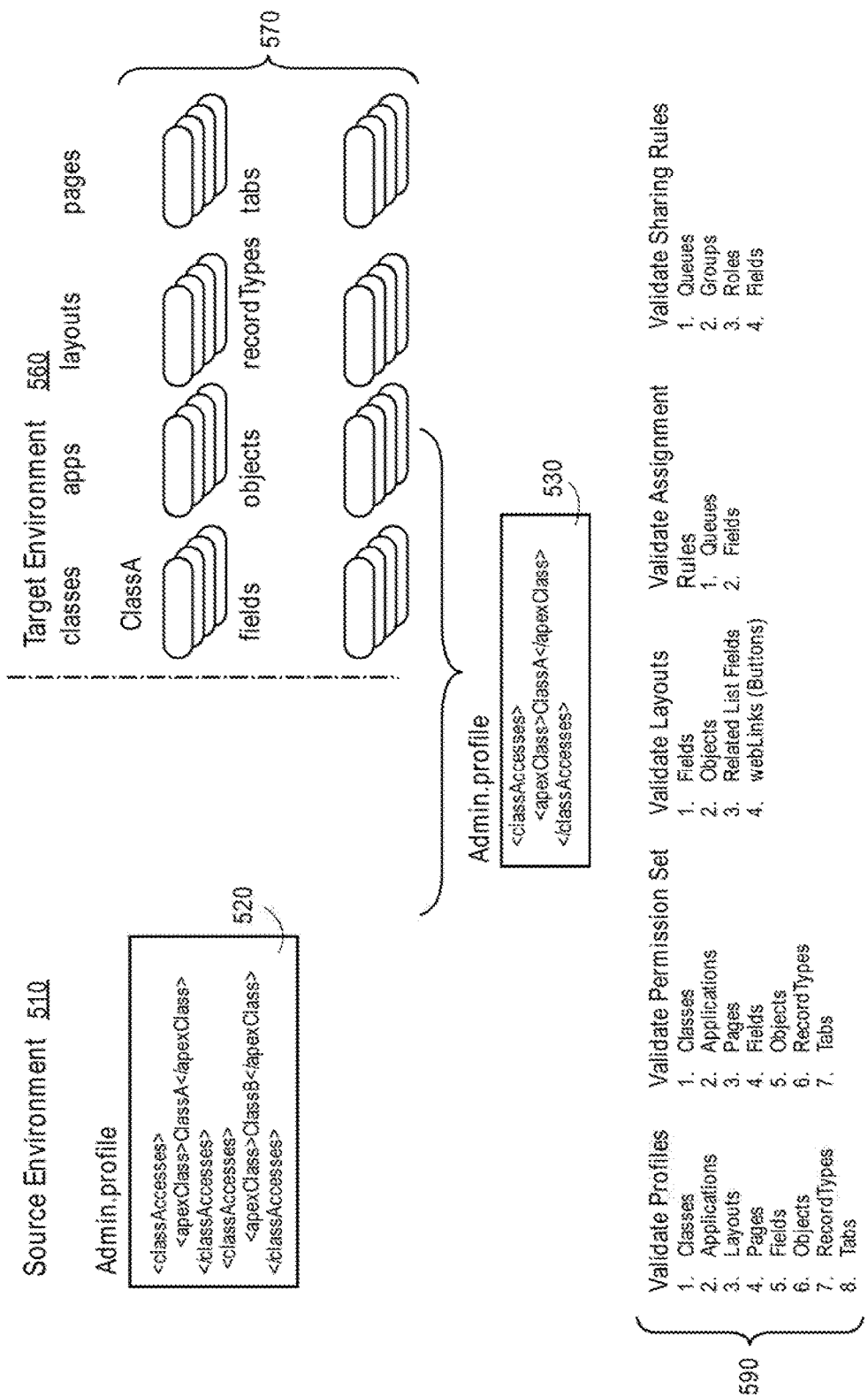
FIG. 5 is a conceptual illustration of one application of profile, permission set, assignment and sharing rules and layout validation according to one embodiment.

FIG. 5 is a conceptual illustration of one application of profile, permission set, assignment and sharing rules and layout validation metadata management 590 according to one embodiment. The example of FIG. 5 includes references to APEX; however, other languages can also be supported.

In one embodiment, the profile, permission set, assignment and sharing rules and/or layout validation metadata 590 can be compared and/or analyzed between source environment 510 and target environment 560. In one embodiment, admin profile 520 defines admin access within source environment 510 and admin profile 530 defines admin access between source environment 510 and target environment 560. In one embodiment, the set of classes for which admin profile 520 allows access is greater than the set of classes for which admin profile 530 allows access. In the example of FIG. 5, "Class A" refers to the set of classes for which both admin profile 520 and admin profile 530 allow access.

In the example of FIG. 5, within source environment 510, metadata is analyzed for Class A 570, which includes one or more of classes, apps, layouts, pages, fields, objects, record types and/or tabs. In other embodiments, other groups of classes can be analyzed.

Figure 6:
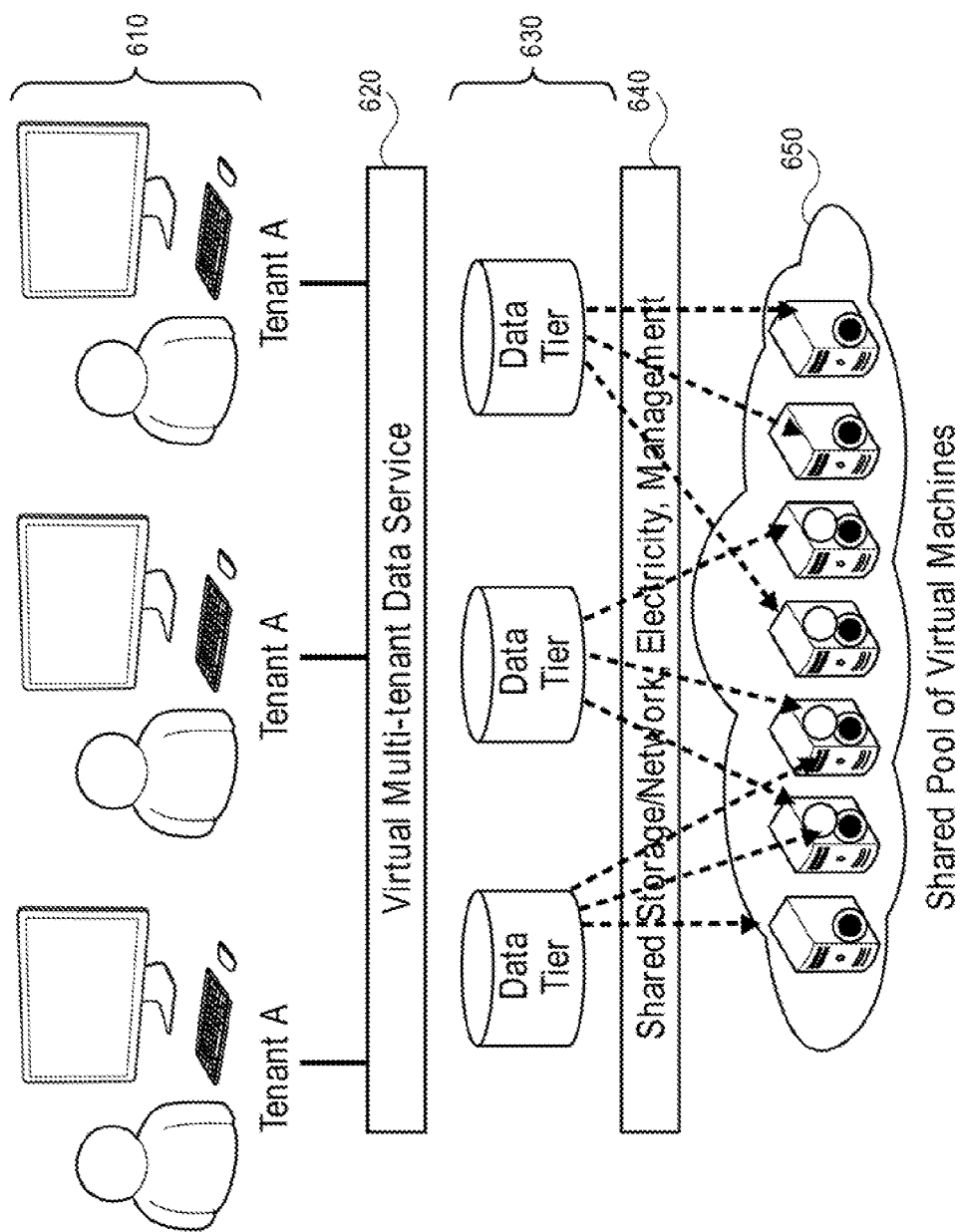
FIG. 6 is conceptual illustration of a fine-grained multitenant environment.

FIG. 6 is conceptual illustration of a fine-grained multitenant environment. In the example of FIG. 6, one or more users 610 corresponding to a tenant of the multitenant environment can access virtual multitenant data service 620. This can be accomplished, for example, via a browser application running on an electronic device (e.g., tablet, smartphone, laptop, desktop, kiosk, wearable device, automotive platform).

In one embodiment, each user corresponds to a tenant and tenants can be spread across multiple machines. In one embodiment, multiple tenants can share resources (e.g., databases, hardware computing platforms). In one embodiment, virtual multitenant data service 620 provides access to one or more database management services that are part of data tier 630. In one embodiment, shared storage/network/electricity management layer 640 provides an interface between data tier and shared pool of virtual machines 650 that provide the computing resources of the multitenant environment.

Figure 7:
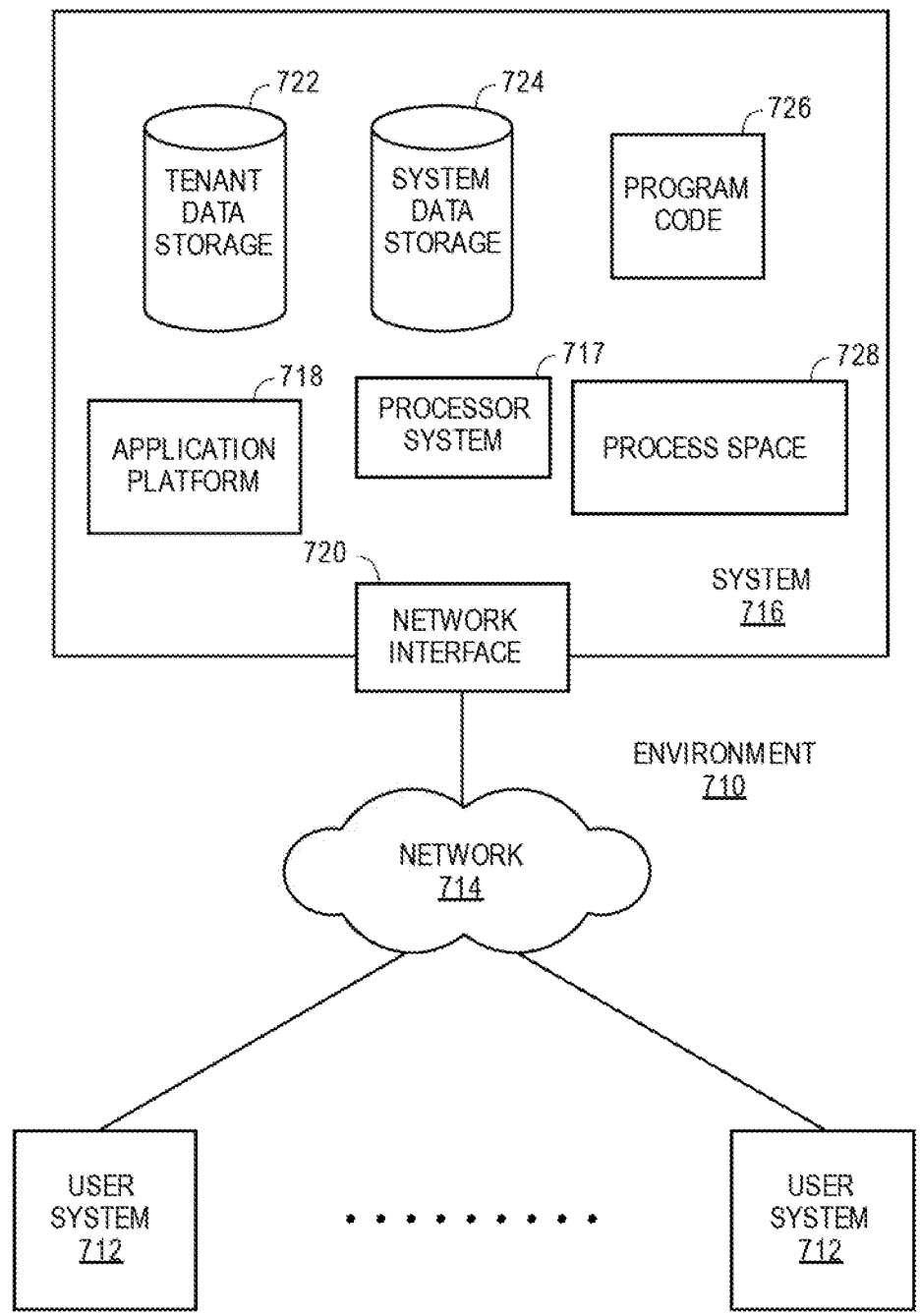
FIG. 7 illustrates a block diagram of one embodiment of an environment where an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in herein FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
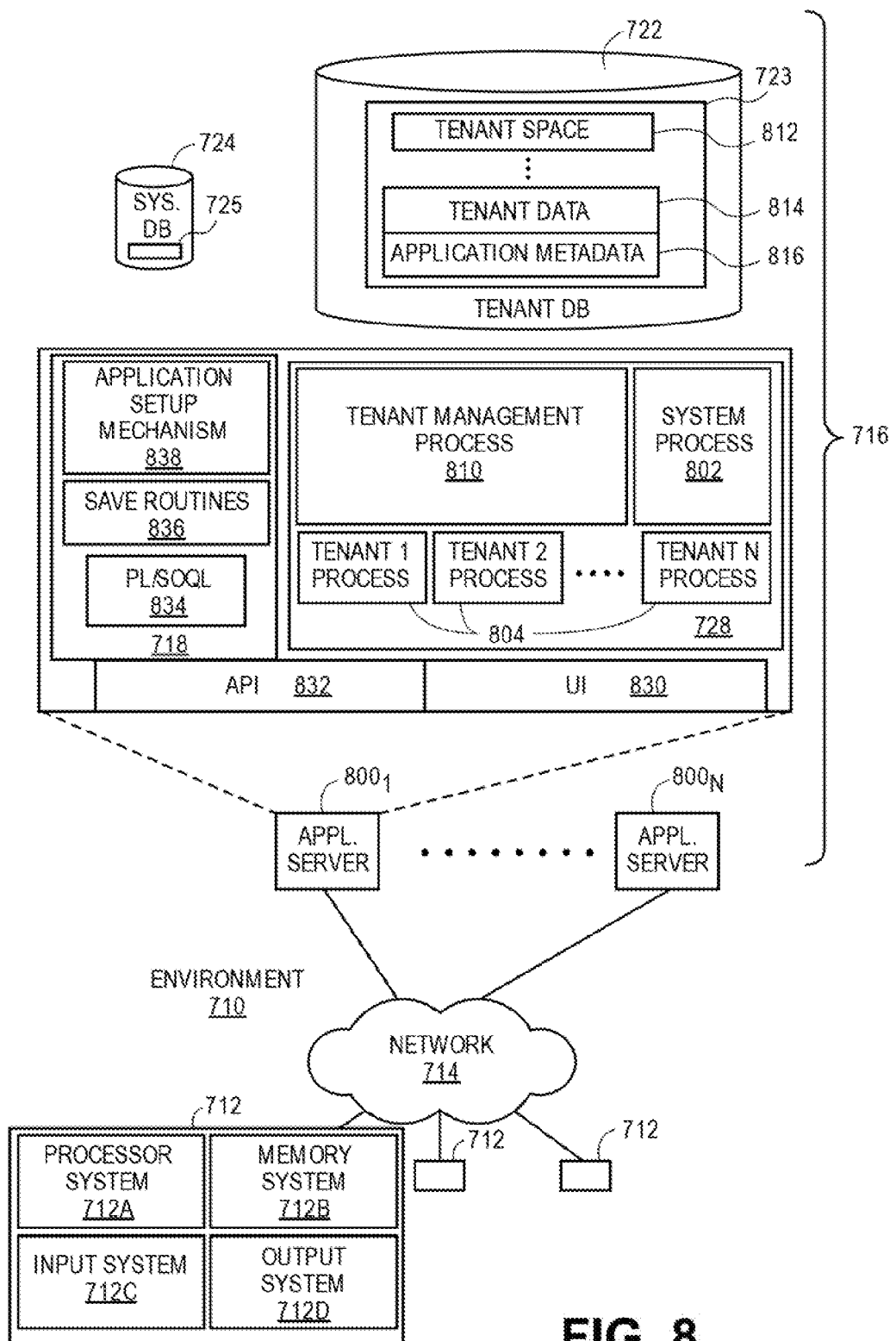
FIG. 8 illustrates a block diagram of one embodiment of elements of the system of FIG. 7 and various interconnections in an embodiment are further illustrated.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 800₁-800_N, system process space 802, tenant process spaces 804, tenant management process space 810, tenant storage space 812, tenant data 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage spaces 812, which can be either a physical arrangement and/or a logical arrangement of data. Within each tenant storage space 812, tenant data 814 and application metadata 816 might be similarly allocated for each user. For example, a copy of a user's most recently used (MRU) items might be stored to tenant data 814. Similarly, a copy of MRU items for an entire organization that is a tenant might be stored to tenant storage space 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, are configurable to cause the one or more processors to:

acquire, with the one or more processors, metadata files from one or more storage devices corresponding to multiple different environments including at least metadata corresponding to different versions of an application, wherein the multiple different environments are executing the multiple different versions of the application, wherein a first portion of the metadata files are deployed via a metadata application program interface (API) and a second portion of the metadata files are deployed through a mechanism other than the metadata API;

compare, with a diff process agent, the metadata files to determine differences between the metadata files;

generate, with the diff process agent, a gap report indicating the differences between the metadata files and actions to be taken to cause at least one of the metadata files to be modified to eliminate at least one of the differences and result in a most recent version of the metadata;

perform, automatically and without user interaction, at least one of an upsert, a delete and an insert on the at least one of the metadata files;

maintain, with the diff process agent, an indication of one or more entities to be notified if one or more of the multiple different environments are out of sync in response to the comparison;

and indicate to at least one of the one or more entities which, if any, of the actions in the indication are to be performed manually, wherein at least one of the actions to be performed manually comprises at least one of a profile change, a permission set change and a rule change.

2. The non-transitory computer-readable medium of claim 1 wherein the metadata comprises at least one of: object changes, assignment rule changes, sharing rule changes, and permission set changes.

3. The non-transitory computer-readable medium of claim 1 wherein the multiple different environments comprise at least a production environment and at least a development environment.

4. The non-transitory computer-readable medium of claim 3 wherein the multiple different environments further comprise at least one of a software version system and a source code management system.

5. The non-transitory computer-readable medium of claim 1 wherein at least two of the multiple different environments are part of a multitenant environment.

6. The non-transitory computer-readable medium of claim 1 wherein the acquisition occurs in response to a request received from a mobile computing platform.

7. A method comprising:

acquiring, with the one or more processors, metadata files from one or more storage devices corresponding to multiple different environments including at least metadata corresponding to different versions of an application, wherein the multiple different environments are executing the multiple different versions of the application, wherein a first portion of the metadata files are deployed via a metadata application program interface (API) and a second portion of the metadata files are deployed through a mechanism other than the metadata API;

comparing, with a diff process agent, the metadata files to determine differences between the metadata files;

generating, with the diff process agent, a gap report indicating the differences between the metadata files and actions to be taken to cause at least one of the metadata files to be modified to eliminate at least one of the differences and result in a most recent version of the metadata;

performing, automatically and without user interaction, at least one of an upsert, a delete and an insert on the at least one of the metadata files;

maintaining, with the diff process agent, an indication of one or more entities to be notified if one or more of the multiple different environments are out of sync in response to the comparison;

and indicating to at least one of the one or more entities which, if any, of the actions in the indication are to be performed manually, wherein at least one of the actions to be performed manually comprises at least one of a profile change, a permission set change and a rule change.

8. The method of claim 7 wherein the metadata comprises at least one of: object changes, assignment rule changes, sharing rule changes, and permission set changes.

9. The method of claim 7 wherein the multiple different environments comprise at least a production environment and at least a development environment.

10. The method of claim 9 wherein the multiple different environments further comprise at least one of a software version system and a source code management system.

11. The method of claim 7 wherein at least two of the multiple different environments are part of a multitenant environment.

12. The method of claim 7 wherein the acquisition occurs in response to a request received from a mobile computing platform.

13. A system comprising:
a memory system to store metadata corresponding to multiple different environments;
one or more processors coupled with the memory system, the one or more processors configurable to acquire metadata files from one or more storage devices corresponding to multiple different environments including at least metadata corresponding to different versions of an application, wherein the multiple different environments are executing the multiple different versions of the application, wherein a first portion of the metadata files are deployed via a metadata application program interface (API) and a second portion of the metadata files are deployed through a mechanism other than the metadata API, to compare the metadata files to determine differences between the metadata files, to generate, with the diff process agent, a gap report indicating the differences between the metadata files and actions to be taken to cause at least one of the metadata files to be modified to eliminate at least one of the differences and result in a most recent version of the metadata, to perform, automatically and without user interaction, at least one of an upsert, a delete and an insert on the at least one of the metadata files, to maintain, with the diff process agent, an indication of one or more entities to be notified if one or more of the multiple different environments are out of sync in response to the comparison, and to indicate to at least one of the one or more entities which, if any, of the actions in the indication are to be performed manually, wherein at least one of the actions to be performed manually comprises at least one of a profile change, a permission set change and a rule change.

14. The system of claim 13 wherein the metadata comprises at least one of: object changes, assignment rule changes, sharing rule changes, and permission set changes.

15. The system of claim 13 wherein the multiple different environments comprise at least a production environment and at least a development environment.

16. The system of claim 15 wherein the multiple different environments further comprise at least one of a software version system and a source code management system.

17. The system of claim 13 wherein at least two of the multiple different environments are part of a multitenant environment.

18. The system of claim 13 wherein the acquisition occurs in response to a request received from a mobile computing platform.

* * * * *